Figure 1:
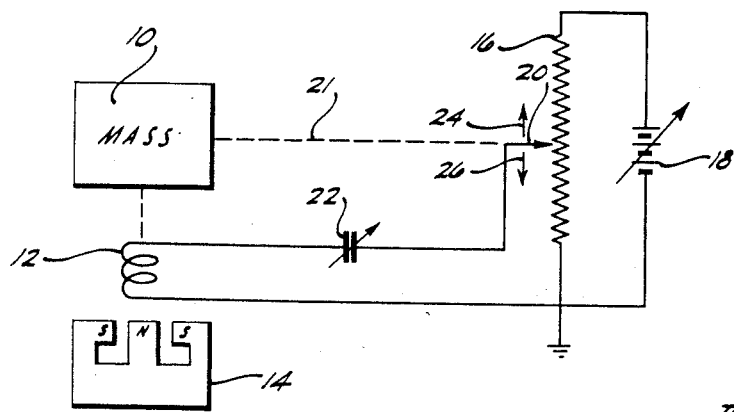

April 9, 1957     R. H. GRIEST     2,788,457
NETWORK FOR DAMPING VIBRATIONS OF MECHANICAL STRUCTURES
Filed Feb. 11, 1953

INVENTOR.
RAYMOND H. GRIEST
BY Nicholas T. Vohn
ATTORNEY.

United States Patent Office 2,788,457
Patented Apr. 9, 1957

2,788,457
NETWORK FOR DAMPING VIBRATIONS OF MECHANICAL STRUCTURES

Raymond H. Griest, Los Angeles Calif., assignor, by mesne assignments, to Hughes Aircraft Company, a corporation of Delaware Application February 11, 1953, Serial No. 336,357

2 Claims. (Cl. 310—93)

This invention relates to means for damping physical movements of mechanical structures, and more particularly to electric circuit means for developing mechanical damping forces substantially instantaneously in response to vibrations of a structure.

For certain instruments, such as accelerometers, it is often necessary to develop a damping force which is accurately proportional to the velocity of the moving or vibrating mass and opposed to it in direction. It is also frequently necessary to provide means for adjusting this damping force, to maintain the force permaently at the adjusted value, and independent of variations in ambient conditions of temperature and pressure. Arrangements heretofore employed for obtaining such damping forces generally do not provide these features to the desired degree. For example, where liquid damping is used, temperature variations of the damping liquid often seriously affect the accuracy of adjustment. Where friction damping is employed, the damping force is not proportional to the velocity and the performance may be degraded. In either case, it is difficult to adjust the damping force and the adjustment is not likely to be permanent.

The present invention provides an electrical network which operates substantially instantaneously in response to small motions or vibrations of a mechanical structure to develop corresponding mechanical damping forces which are not subject to the disadvantages mentioned above. In accordance with this invention, the structure is utilized to generate a varying current representative of small vibratory movements thereof. The varying current is impressed upon a conductive element which moves with the structure and is disposed within a steady magnetic field. By virtue of the varying current flowing through the conductive element, such conductive element, and hence the structure, is urged in a direction to oppose the motion of such structure, thereby to dampen the motion of the structure.

It is, therefore, an object of this invention to provide an electrical network cooperating with a movable structure to develop mechanical damping forces for keeping vibratory movements of such structure at a minimum.

It is another object of this invention to provide, for a structure to be restrained against movement from a predetermined position, an electrical network including a conductive element disposed within a steady magnetic field and arranged in fixed spaced relationship with such structure, in which such structure operates the network to cause a current that varies in response to the movement thereof to flow through the conductive element and to cause such conductive element to be urged in a direction opposing the motion of the structure.

It is a further object of this invention to provide an electrical network for operation by a mechanical body to develop damping forces in response to vibrations of such body, and which employs a minimum number of inexpensive component parts and which readily permits adjustment of the damping force.

Figure 2:
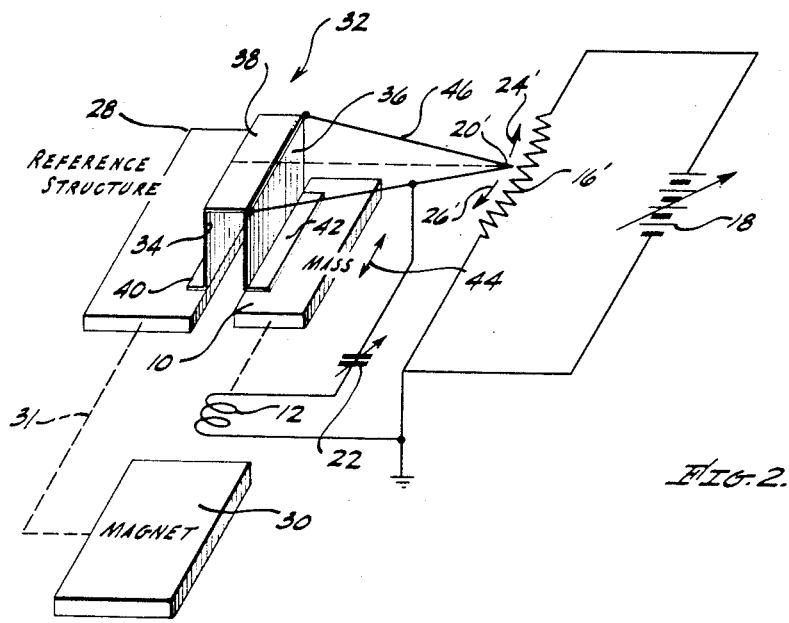

The novel features which are believed to be characteristic of the invention, both as to its organization and method of operation, together with further objects and advantages thereof, will be better understood from the following description considered in connection with the accompanying drawing, in which preferred embodiments of the invention are illustrated by way of example. The scope of the invention is pointed out in the appended claims. Referring to the drawing:

Fig. 1 is a schematic diagram of an electrical network employed in conjunction with a mechanical structure, in accordance with this invention; and Fig. 2 is a diagram similar to Fig. 1, but partially perspective, to illustrate a particular use of the circuit of this invention.

Referring to the drawing, in which like reference characters indicate like parts throughout, and more particularly to Fig. 1, a mechanical structure or mass 10, subject to small vibrational motions which are to be damped, has an inductor or coil 12, mechanically and rigidly coupled or linked thereto. Inductor 12 is arranged in fixed spaced relation with respect to mass 10; this relationship may be achieved, for example, by securing inductor 12 to the mass 10. The inductor 12 is disposed in a steady magnetic field so that, upon movement of mass 10, inductor 12 moves toward or away from the source of the steady magnetic field. Suitable means to provide the steady magnetic field may comprise a permanent magnet 14, as shown, having two south poles (S) and one north pole (N).

A potentiometer resistor 16 is adapted for connection to a direct-current voltage source, which for example may be a battery 18 and having its negative terminal connected to ground. A sliding arm contact 20 for potentiometer resistor 16 is adapted to be coupled to one terminal of inductor 12 by suitable means, such as an adjustable capacitor 22, to permit only varying current to flow through inductor 12. The other terminal of inductor 12 is preferably connected to ground, as shown. Like inductor 12, sliding contact 20 is mechanically coupled to mass 10 to move or vibrate with mass 10.

In the absence of movement of sliding contact 20, there is, of course, no current flow through inductor 12 because capacitor 22 blocks direct currents. However, upon movement of sliding contact 20 along potentiometer resistor 16, due to movement of mass 10, current impulses representative of the magnitude of such movement will be passed through capacitor 22 and inductor 12. Depending upon the magnitude of the current flowing through inductor 12 and the position of inductor 12 within the field of permantnt magnet 14, the current flowing through inductor 12 forces the inductor 12 in a direction toward or away from permanent magnet 14.

As previously pointed out, sliding contact 20 is mechanically linked at 21 to mass 10 and adapted for movement along potentiometer resistor 16 in response to motions of the mass 10. A preferred normal position for sliding contact 20, in the absence of motion of the mass 10, is at the approximate center of potentiometer resistor 16. Therefore, upon motions of the mass 10 which cause sliding contact 20 to move along potentiometer resistor 16 about its center, as indicated by oppositely-directed arrows 24, 26, currents of magnitudes representative of the direction and magnitude of the movement of sliding contact 20 will flow through inductor 12. Current impulses flowing through the inductor 12 react against the steady magnetic field in a conventional manner, and a force is developed in inductor 12 in a direction opposing its motion. Mass 10 will be forced in a direction opposing that motion thereof which created the current, and the motion of mass 10 will be damped to a degree depending upon the force of movement imparted to inductor 12. By suitable choice of circuit components, such as the proper value of inductance for inductor 12, the voltage of battery 18, and the value of capacitance for capacitor 22, the opposing forces of movement imparted to inductor 12 can be adjusted to achieve a variable degree of damping for the motion of mass 10.

A particular application of the electrical damping network described above is shown in Fig. 2. Referring to Fig. 2, mass 10 is supported with respect to a fixed or reference structure 28. A suitable magnet 30, which may be either an electromagnet or the permanent magnet 14 in Fig. 1, is shown mechanically linked at 31 to the reference structure 28. Such linkage 31 is shown to indicate that the magnet 30 is disposed in fixed spaced relationship with respect to reference structure 28.

Means for detecting the motions of mass 10 may comprise a multiplying lever of the type described and claimed in a copending application of the applicant herein entitled Multiplying Lever, Serial No. 327,555, filed December 23, 1952, now Patent No. 2,723,565, and assigned to the same assignee as is the present application. Such a multiplying lever utilizes a flexible channel-shaped member 32 having a pair of coextensive and parallel flanges 34, 36 which extend perpendicularly from a flat web portion 38, and which terminate in respective flared end sections 40, 42. The flared end sections 40, 42 are secured, respectively, to the reference structure 28 and to the mass 10. Upon movement of mass 10 parallel to and in the plane of the flared section 42, in either direction as indicated by the double-headed arrow 44, the parallel flanges 34, 36 deform, as by tending to twist clockwise at the front end and counterclockwise at the rear end thereof, to permit counterclockwise rotation of the web 38 in its own plane.

A conductive pointer element 46 is parallelly affixed to the web 38 for rotation therewith. The free end of pointer element 46 is the sliding contact 20' of a potentiometer resistor 16'. Resistor 16' preferably is curved to coincide with the arc through which the tip of sliding contact 20' of pointer 46 moves. Coupling capacitor 22 is connected between pointer 46 and inductor 12 to provide means for supplying current impulses to the inductor 12 in the manner previously described. By virtue of this arrangement, small motions of the mass 10 are magnified by correspondingly large physical movements of pointer 46, and sufficiently large currents are passed through inductor 12 to urge inductor 12 in a direction to oppose and damp the motions of mass 10.

For a more complete description of the multiplying lever described above, reference may be had to the above-mentioned copending application.

From the foregoing explanation, it is evident that there has been described a unique electrical network for developing damping forces electromagnetically to damp the movement of a vibratory structure, which has the effectiveness of damping obtainable with viscous liquids, but which does not suffer similar disadvantages.

What is claimed is:

1. In combination with a vibratory mechanical structure having vibrational motion which is to be damped, means for establishing a steady magnetic field adjacent the structure, a conductive element disposed within said magnetic field and in fixed spaced relation with respect to the structure, a source of direct-current voltage, potentiometer means coupled to said source and having a movable contact fixedly spaced with respect to the structure and movable therewith, and capacitor means for coupling said movable contact to said conductive element to effect passage through said conductive element of current impulses representative of the direction and magnitude of movement of the structure and to cause said conductive element to be forced in a direction opposite to the motion of the structure, thereby to effectively damp vibrations of the structure.

2. In combination with a structure which is subject to undesirable vibrations, an arrangement for damping the vibrational motion of the structure comprising; means disposed adjacent to said structure to provide a steady magnetic field parallel to the direction of the vibrational motion of said structure, a source of direct-current voltage, a potentiometer connected to said source to provide a potential gradient across said potentiometer, said potentiometer including a sliding contact mechanically coupled to said structure for movement therewith, a conductive element rigidly secured to said structure and disposed within said steady magnetic field for producing a second magnetic field parallel to the direction of said vibrational motion in response to a current flowing therein, and means connecting said conductive element to said sliding contact and said source and being operative only upon motion of said sliding contact to pass a current proportional to the magnitude of the movement of the structure through said conductive element in a direction that will cause the interaction of said steady magnetic field and said second magnetic field to force said conductive element in a direction opposite to the motion of the structure, thereby to effectively damp vibrations of the structure.

References Cited in the file of this patent
UNITED STATES PATENTS

| | | |
|---|---|---|
| 1,535,538 | Maxfield et al. | Apr. 28, 1925 |
| 2,182,136 | Ricchiardi | Dec. 5, 1939 |
| 2,361,071 | Vany | Oct. 24, 1944 |
| 2,577,875 | Cloud | Dec. 11, 1951 |